United States Patent
Dano et al.

(10) Patent No.: US 7,345,386 B2
(45) Date of Patent: Mar. 18, 2008

(54) ELECTRIC DRIVE UNIT

(75) Inventors: Viktor Dano, Erlangen (DE);
Hans-Joachim Fach, Nuremberg (DE);
Ferdinand Friedrich, Heroldsberg (DE); Matthias Gramann, Renchen (DE); Reinhard Orthmann, Leonberg (DE); Hermann Pirner, Sulzbach-Rosenberg (DE); Thomas Schencke, Schoenow b. Berlin (DE); Thomas Susemihl, Berlin (DE); Wolfgang Thiel, Denkendorf (DE); Dietrich Von Knorre, Ganderkesse (DE)

(73) Assignees: Conti Temic microelectronic GmbH, Nuremberg (DE); TEMIC Automotive Electric Motors GmbH, Berlin (DE)

( * ) Notice: Subject to any disclaimer, the term of this patent is extended or adjusted under 35 U.S.C. 154(b) by 290 days.

(21) Appl. No.: 10/498,742

(22) PCT Filed: Nov. 27, 2002

(86) PCT No.: PCT/EP02/13335

§ 371 (c)(1),
(2), (4) Date: Jan. 25, 2005

(87) PCT Pub. No.: WO03/052905

PCT Pub. Date: Jun. 26, 2003

(65) Prior Publication Data

US 2005/0116554 A1 Jun. 2, 2005

(30) Foreign Application Priority Data

Dec. 14, 2001 (DE) ............... 101 61 367

(51) Int. Cl.
*H02K 1/32* (2006.01)

(52) U.S. Cl. ............ 310/61; 310/64; 417/423.14
(58) Field of Classification Search ............ 310/58, 310/60 A, 61–64, 67 R; 417/423.14, 410.1
See application file for complete search history.

(56) References Cited

U.S. PATENT DOCUMENTS

| 4,797,602 | A | * | 1/1989 | West ............... 322/10 |
| 5,944,497 | A | * | 8/1999 | Kershaw et al. ....... 417/423.8 |
| 6,051,899 | A | | 4/2000 | Walther et al. |
| 6,107,708 | A | | 8/2000 | Yamaguchi et al. |
| 6,445,097 | B1 | * | 9/2002 | Zeiler et al. ........... 310/71 |

FOREIGN PATENT DOCUMENTS

| DE | 4122529 | 1/1993 |
| DE | 4418000 | 11/1995 |
| EP | 1063752 | 12/2000 |
| EP | 1079502 | 2/2001 |

* cited by examiner

*Primary Examiner*—Dang Le
(74) *Attorney, Agent, or Firm*—W. F. Fasse; W. G. Fasse

(57) ABSTRACT

An electric drive unit includes an electric motor for driving a fan. The motor has an electronic control module. An impeller wheel for producing a working air flow is mounted by bearings on an axle of the electric motor. The hub of the impeller wheel has at least one preferably two walls enclosing a cooling space or cooling space portions. At least one cooling surface of a cooling body is in contact with components of the electronic control module and projects into the cooling space. A gap formed between the hub of the impeller wheel and a carrier section communicates with an inner hub space. Holes (43, 322) communicating with the hub inner space are provided in at least one component of the electric drive unit. When the impeller wheel rotes a convection cooling air flow is established between the gap and the holes.

10 Claims, 4 Drawing Sheets

ELECTRIC DRIVE UNIT

TITLE OF THE INVENTION

1. Field of the Invention

The invention relates to an electric drive unit with a motor cooling arrangement.

2. Background Information

Electrical drive units are used in a multitude of application areas, for example in home appliances or in the area of motor vehicles. Particularly in motor vehicles, different movable components of the motor vehicle can be adjusted by means of electrical drive units, for example seats, window lifters, sun roofs, etc., or components may be operated with a variable r.p.m. (for example fans). Electrical drive units used for ventilation comprise an electric motor (fan motor) functioning as a drive device for providing electrical drive power, an electronic control module for controlling the electric motor, for example for the r.p.m. and power regulation (closed loop control) of the electric motor and a rotatable impeller wheel driven by the electric motor as a work performing mechanism for producing a working airflow.

The electronic control module comprises structural components which, as a rule, are mounted on a printed circuit board. These structural components include particularly also power components with a high dissipation power because in the operation of the electric drive unit frequently currents flow with a very high amperage, for example 50 A. Accordingly, a high input power of the electrical drive unit and thus of the power components results. Therefore, a sufficient cooling for the electronic control module, particularly for the structural components of the electronic control module, must be provided especially for the dissipation of the power loss of the structural power components. For this purpose the structural components of the electronic control module or at least the power components thereof, are brought into contact with cooling surfaces of a cooling body. More specifically, the power components are mounted on these cooling surfaces of the cooling body.

In order to assure a compact construction and thus a small structural size of the electric drive unit, it is necessary on the one hand to build the electronic control module and the electric motor mounted on a motor carrier as small as possible while on the other hand positioning the electronic control module as close as possible to the electric motor. Particularly, the electronic control module should be directly connected to the motor carrier. In this case achieving a sufficient cooling of the structural components of the electronic control module poses a problem, particularly the dissipation of the power loss of the structural power components because the possibilities of cooling these components are substantially limited or even not available at all. In the German Patent Publication DE 41 22 529 A1, the surface of the motor carrier functioning as a cooling body is increased by forming a ring wall for the motor carrier which extends into the area of the rotor of the electric motor, whereby the heat dissipation is improved without any increase in the space requirement for the electric drive unit.

SUMMARY OF THE INVENTION

It is the object of the invention to provide a compact electric drive unit in which a simple, reliable and cost effective construction and operation are made possible in combination with an efficient cooling of the electronic control module, particularly the power components and other elements of the drive unit.

In the present electric drive unit the cooling of the structural components of the electronic control module, particularly of the power components of the electronic control module is realized by a cooling body having at least one cooling surface in contact with the structural components to be cooled. The present drive unit comprises an impeller wheel set on the rotational axis of the electric motor provided as a drive device. The impeller wheel acts as a work unit for producing a working air stream. In the present unit at least one cooling surface, preferably all cooling surfaces are at least partially, preferably completely, reaching into the hub of the impeller wheel. Stated differently at least one cooling surface extends at least partially into the hub of the impeller wheel. For this purpose the impeller wheel is constructed with a double wall including an outer wall and an inner wall and a hub inner space formed between the outer wall and the inner wall. The cooling surfaces of the cooling body are extended into the hub inner space of the impeller wheel. Hub chambers are formed in the hub inner space between the outer wall and the inner wall by radially extending ribs (lands) which cause a stiffening of the hub of the impeller wheel. The cooling surfaces of the cooling body that reach into the hub of the impeller wheel are introduced into the hub inner space up to the vicinity of these ribs, preferably directly bordering on these ribs. When the impeller wheel is set on the rotational axis of the electric motor, a gap is formed between the hub of the impeller wheel and a carrier section. The carrier section serves for supporting the electric motor and the electronic control module as well as for the securing of the electric drive unit. For example, the gap is formed between the outer wall of the hub of the impeller wheel and a casing forming a central part of the carrier section. Further, through-holes are formed at a suitable location of the electric drive unit for the air present in the hub inner space. Preferably the through-holes are formed in the hub of the impeller wheel, particularly as bores on the upper side of the hub of the impeller wheel and/or in the rotor of the electric motor. The through-holes are formed particularly as longitudinal holes on the top side of the rotor and/or on the bottom side of the carrier section, particularly on the underside of the casing functioning as a central part of the carrier portion. During the operation of the electric drive unit and due to the rotation of the impeller wheel, a primary working air flow is produced by the rotation of the wings of the impeller wheel secured to the outer wall of the hub of the impeller wheel. Due to this primary working air flow a secondary air stream is produced in the gap between the hub of the impeller wheel and the carrier section. The secondary air stream causes a pressure differential between the air present in the area of the gap and the air present in the area of the holes in the hub when the impeller wheel rotates. As a result of the pressure differential a convection air flow is imposed by the active onflow at the gap for the air present in the hub inner space. Due to this imposed convection air flow the heated air present in the hub inner space escapes through the respective exit hole either out of the gap or out of the through-holes, whereby cooling air is introduced into the hub inner space either through the holes in the hub or through the gap, from the space outside, that is from outside of the hub of the impeller wheel. Thereby, the cooling surfaces of the cooling body present in the hub inner space are actively cooled by the imposed convection air flow from the space outside of the inner hub space whereby the convection air flow acts as a cooling medium in the inner hub space by flowing around the cooling surfaces which are correspondingly cooled.

Electric motors for use in the electric drive unit may be differently operated and configured fan motors. In this context asynchronous AC-motors which run asynchronously relative to the supply frequency, or synchronous motors which run in synchronism with the supplied frequency, may be used. These AC-motors are externally commutated. DC-motors maybe used which are self-commutating in dependency on the applied input voltage. Particularly brushless DC-motors operating as permanently excited synchronous motors may be used. In such motors the commutation is linked with a position recognition. Thus, these brushless DC-motors are operated as electronically commutated, self-commutating DC-motors (EC-DC-motors). More specifically, the self-commutation takes place depending on the input voltage applied to the individual coils. Further, different arrangements of the fixed stator relative to the rotating rotor may be selected. Particularly, in the so-called external rotor motors the rotor rotates on the outside of the stator and in so-called internal rotor motors the rotor rotates on the inside of the stator.

Advantageously, the present electric drive unit realizes a compact construction without any interference of the cooling surfaces of the cooling body provided for cooling, with the motion of the impeller wheel. This is so because the cooling surfaces are not positioned in the working air flow or they do not adversely influence the working air flow, whereby annoying noise that would otherwise result, does not occur. By utilizing the air flow that occurs when the electric drive unit operates, particularly of the active onflow at the gap between the hub of the impeller wheel and the carrier section, and the use of the pressure relationships caused thereby with the imposed convection of air out of the hub inner space, no separate cooling medium is required for cooling the cooling surfaces of the cooling body inside the hub inner space of the impeller wheel. The supply of external air for cooling into the inner space of the hub and the removal of heated air out of the hub inner space is accomplished by simple entrance holes and exit openings which possibly are already there. These holes are so constructed that a sufficient inflow of external air and thus the cooling of the cooling surfaces of the cooling body is assured. The pressure differential between the gap on the one hand and the through-holes on the other hand, the imposed convection in the hub inner space and the cooling effect are all independent of the flow direction of the working air flow produced by the motion of the impeller wheel. As a result, a good cooling effect is achieved independently of the installation or rotation direction of the impeller wheel and thus independently of the motion of the impeller wheel relative to the flow direction of the working air flow. The gap is formed between the hub of the impeller wheel and the carrier portion. The cooling effect depends on the removal of heated air from the hub inner space and on the supply of cool air from the external space. Thus, a multitude of wide ranging applications and use possibilities are achieved for the electric drive unit.

BRIEF DESCRIPTION OF THE DRAWINGS

The electric drive unit will be described more closely in the following with reference to an example embodiment and in connection with the accompanying drawings, wherein.

Figure 1:
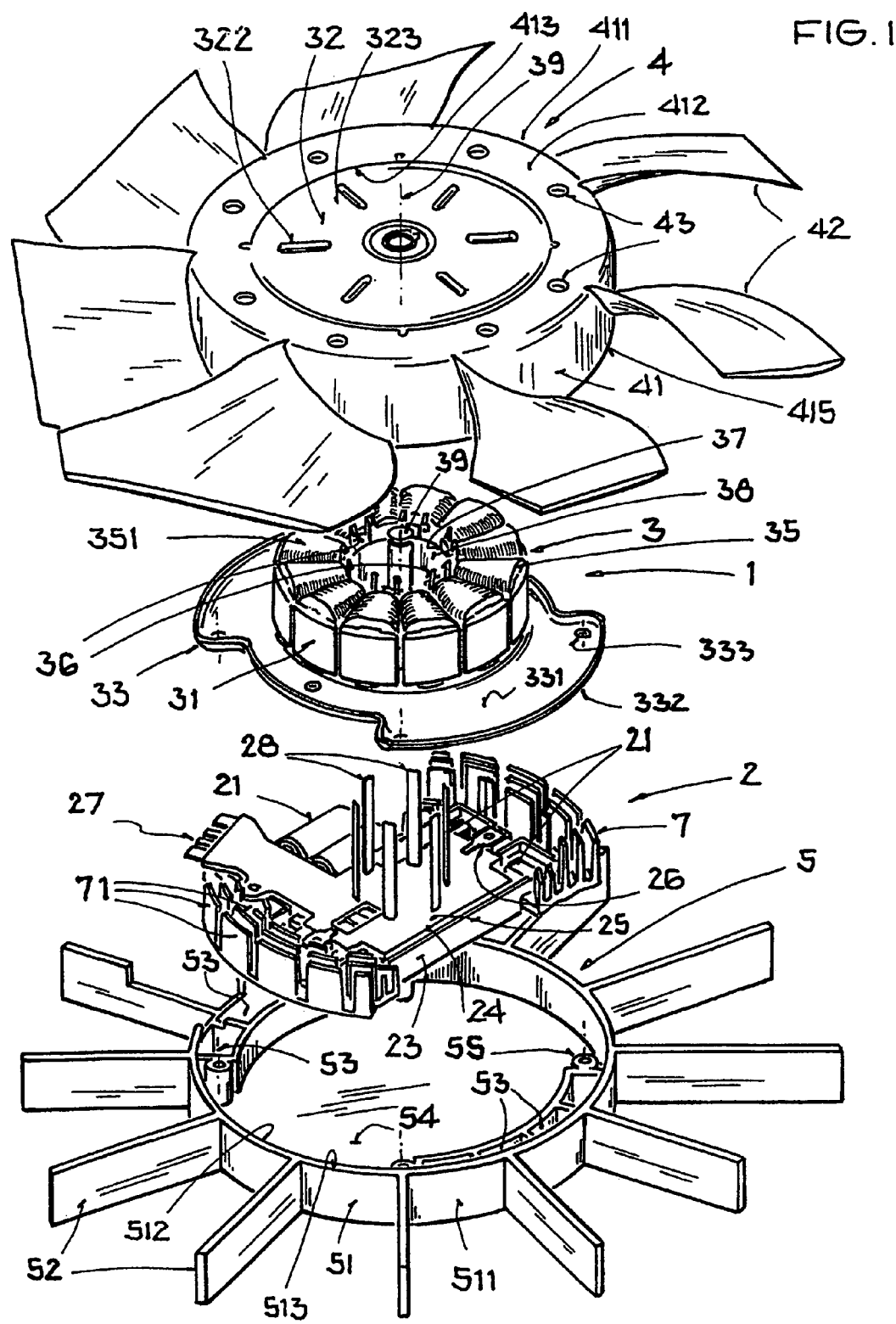
FIG. 1 shows a three-dimensional illustration of the electric drive unit with the components separated from one another.

DETAILED DESCRIPTION OF PREFERRED EXAMPLE EMBODIMENTS AND OF THE BEST MODE OF THE INVENTION

The electric drive unit 1 comprises, for example a brushless DC-motor 3 constructed as a fan motor of a motor vehicle. The motor functions as a drive device. The unit further includes an electronic control module 2 for controlling of the fan motor 3 particularly for varying the r.p.m. of the fan motor 3, an impeller wheel 4 for producing a working air flow (useful air flow) functioning as a working device and a carrier section 5 for mounting the electronic control module 2 and the fan motor 3.

The r.p.m. of the fan motor 3 shall, for example be variable within the r.p.m. range between 400 r.p.m. and 2400 r.p.m. (rated r.p.m.). The r.p.m. change is achieved by varying a DC-voltage supplied to the fan motor 3. The fan motor 3 delivers its defined power at the rated r.p.m. of, for example 2400 r.p.m. The fan motor 3 has, for example a maximum input power of 600 W with a motor input voltage of 12 V, whereby the maximum motor current is 50 A. This current is distributed onto the coil windings of the fan motor 3 by commutation (commutation of the motor sections of the fan motor 3).

Figures 3, 4:
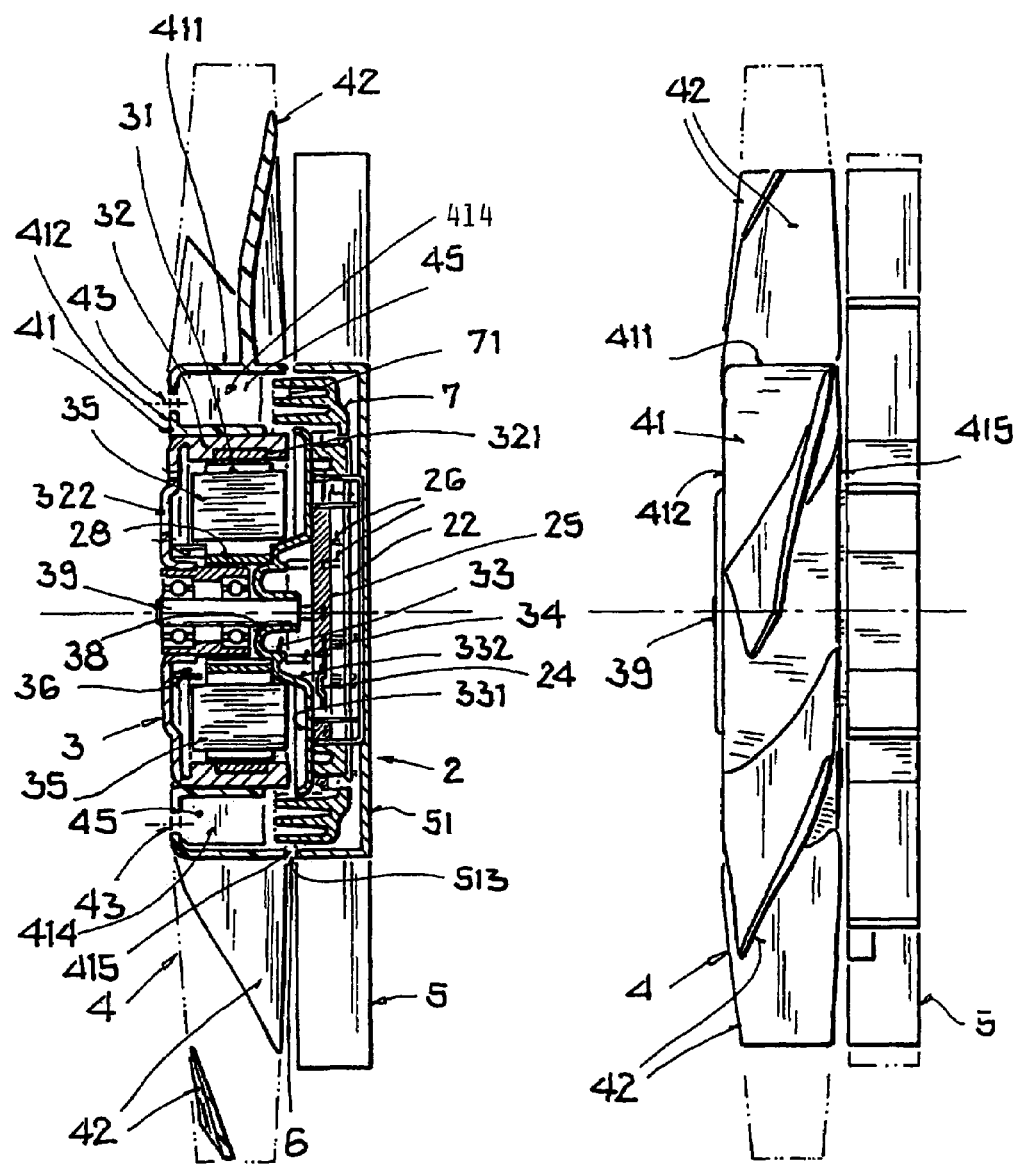
FIG. 3 is a sectional view of the interconnected components of the electric drive unit.
FIG. 4 is a side view of the interconnected components of the electric drive unit.

The components of the fan motor 3 separated from one another are shown in FIG. 3, including the electronic control module 2, the impeller wheel 4, and the carrier section 5 of the electric drive unit 1. Structural components, for example electronic elements 21 of the electronic control module 2 which is arranged on the underside 332 of the motor support 33 are secured on a printed circuit board 22 (compare FIG. 3). Structural components or electronic elements 21 are particularly provided as commutation transistors for commutating the motor sections of the fan motor 3. For example, four commutation transistors constructed as field effect transistors are provided having connector pins in contact with contact points on the printed circuit board 22 or with a stamped grid 24. The housings of the field effect transistors are, for example arranged on cooling surfaces 71, for example made of aluminum, of the cooling body 7. In order to protect the structural components or electronic elements 21 of the electronic control module 2 the printed circuit board 22 is mounted in a housing 23, for example made of synthetic material. The stamped grid 24 is provided for the electrical connection of the structural components or electronic elements 21 and for providing an external connector possibility. The stamped grid 24 is formed of a plurality of stamped grid connector tabs 26 enclosed by synthetic material 25 by spraying. The stamped grid connector tabs 26 leading outside are integrated in at least one plug-in connector 27. Particularly at least one connector plug can be connected to the plug-in connector 27 for connecting the electric drive unit 1 with further structural packages, for example for connecting the electric drive unit 1 with the onboard power supply net of the motor vehicle for a voltage supply and/or with a switching unit for feeding a control signal for switching on the fan motor 3. Furthermore, the stamped grid 24 forms connector elements 28 which lead perpendicularly away from the plane of the printed circuit board 22. For example, six such connector elements 28 are provided, whereby for example two connector elements 28 are provided for the voltage supply of the fan motor 3 and four connector elements 28 are provided for the commutation of the fan motor 3. The connector elements 28 are made, for example of electrolytic copper with a thickness of, for example 0.8 mm and comprise, for example a square diameter of, for example 6 mm. The length of the connector elements 28 is selected in accordance with the height of the stator 31 of the fan motor 3 and thus depending on the power of the electric drive unit 1. The length of the connector elements 28 is, for example, about 70 mm.

The fan motor 3, for example constructed as an external rotor motor, comprises a circular stator 31 formed of a plurality of stator coils 35 with coil windings 351. The stator 31 is mounted on a top side 331 of the motor support 33. This "top side" 331 faces upwardly in FIG. 1. The fan motor 3 further comprises a rotor 32 rotating about the stator 31 on the outside of the stator 31. The stator coils 35 are formed as circular segments and are assembled to form a coil assembly in such a way that a central opening 38 is formed in the center of the coil assembly so that a stationary axle 39 of the fan motor 3 can pass through the opening 38. A plurality of holes, for example in the form of elongated holes 322, is formed in a side wall 323 of the rotor 32. This side wall 323 faces upwardly in FIG. 1. The longitudinal holes 322 are, for example arranged in a star shape fanning out radially away from the stationary axle 39 of the fan motor 3. The rotor 32 rotates on bearings (FIG. 3) about the axle 39. The motor support 33 comprises lead-throughs 34 (compare FIG. 3) for the connector elements 28 extending from the stamped grid 24 of the electronic control module 2. The connector elements 28 are led through the lead-throughs 34 to the individual stator coils 35. Contact elements in the form of contact hooks 36 and/or contact surfaces 37 are attached to the ends of the coil winding 351 of the stator coil 35 for realizing the connector contacts for the stator 31 or rather the stator coils 35. The contact elements 28 reach through the lead-throughs 34 and along the inside of the central opening 38. The contact elements 28 are electrically connected in a suitable manner, either with the contact hooks 36 or with the contact surfaces 37. For example, the connector elements 28 are welded to the contact surfaces 37. The holes 333 formed in the motor support 33 serve for securing the motor support 33 and thus the electric motor 3 and the electronic control module 2 to the carrier section 5.

The impeller wheel 4 comprises the hub 41 attached to the rotor 32 of the fan motor 3 and the wings 42 which are radially arranged on the radially outer cylindrical wall 411 of the hub 41, see FIG. 3. For example seven wings 42 are provided. Through-holes, for example in the form of bores 43 are formed in a radially outer side portion 412 of the hub 41. The bores 43 serve just as the elongated holes 322 on the side wall 323 of the rotor 32 for the supply of external cooling air into the hub inner space 414 formed between the radially outer wall 411 and the radially inner cylindrical wall 413 of the hub 41 see FIG. 2. These bores 43 and elongated holes 322 alternatively serve for the discharge of the air present in the hub inner space 414. The impeller wheel 4 is rotatably secured by bearings to the carrier section 5 whereby a rim or inner side 415 of the hub 41 faces a central portion 51 of the carrier section 5 to form a gap 6 to be described below.

The central portion 51 of the carrier section 5 is, for example, shaped as a casing in the form of a circular ring. A plurality of radially arranged lands 52 shown in FIG. 1 are provided on the outer wall 511 of the central portion 51 for securing the carrier section 5 and thus the electrical drive unit 1. The inner space 54 of the central portion 51 is adapted for the installation of the electronic control module 2, whereby a plurality of chambers 53 are formed on the inner wall 512 of the central portion 51 for receiving the cooling surfaces 71 of the cooling body 7 of the electronic control module 2. Furthermore, a plurality of retainer openings 55 are provided on the inner wall 512 of the central portion 51 neighboring to the chambers 53 and corresponding to the holes 333 in the motor carrier 33. The motor carrier 33 and thus the fan motor 3 are secured through these retainer openings 55 from the top side 513 of the carrier section 5 by means of suitable securing means for example by means of screws in the central portion 51 of the carrier section 5. The carrier section 5 in turn is secured by means of the lands 52 to the installation location provided for and suitable for the installation on the chassis or aggregates of the motor vehicle, for example screwed to the radiator of the motor vehicle.

Figure 2:
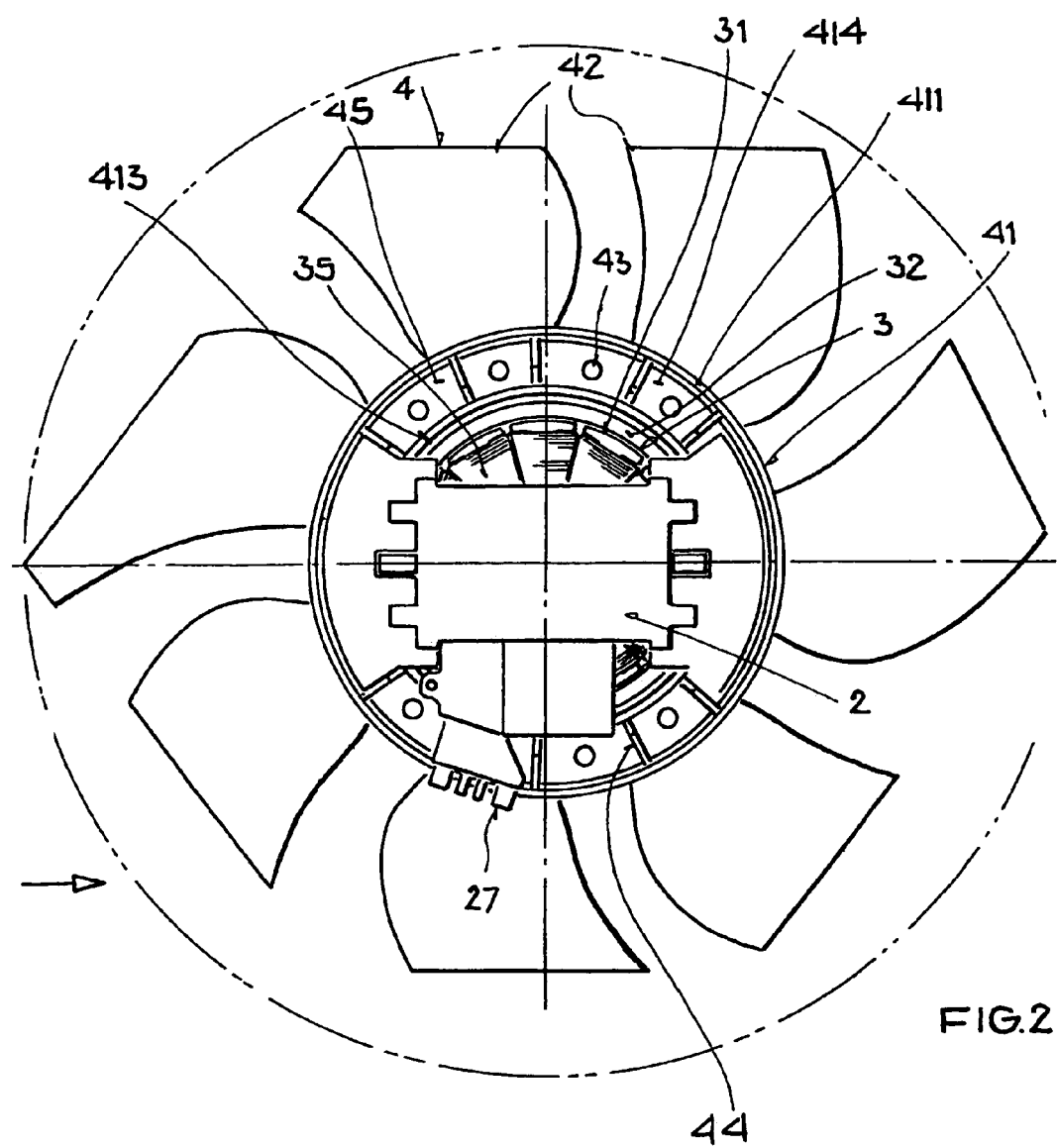
FIG. 2 is a plan view onto the bottom of the interconnected components of the electric drive unit.
Figure 5:
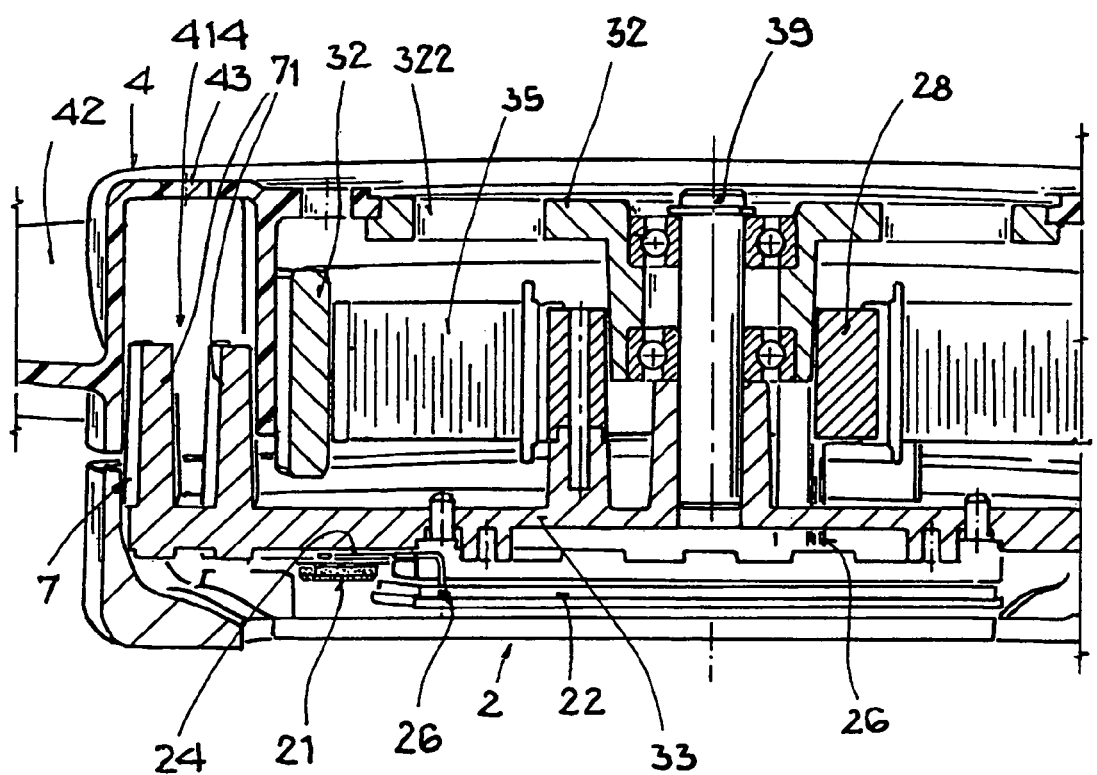
FIG. 5 is a sectional view of the interconnected components of the electrical drive unit showing a modified configuration of the components as compared to FIG. 3.

FIG. 2 shows a bottom view of the assembled electrical drive unit 1. The hub 41 of the impeller wheel 4 is constructed with an axially extending double wall including the radially outer cylindrical wall 411 and the radially inner cylindrical wall 413. These cylindrical walls 411 and 413 enclose the hub inner space 414 formed between the outer wall 411 and the inner wall 413. This hub inner space 414 is subdivided in a partial circumferential area into hub chambers 45 by ribs 44. The ribs 44 are arranged between the outer wall 411 and the inner wall 413 of the hub 41 and cause a stiffening of the hub 41 of the impeller wheel 4. The wings 42 are secured to the radially outer wall 411 of the hub 41 of the impeller wheel 4. The radially inner wall 413 of the hub 41 of the impeller wheel 4 is connected to the rotor 32 of the electric motor 3. The rotor 32 rotates about the stator 31 with the aid of the bearings shown in FIGS. 3 and 5. Space radially inwardly of the wall 13 is also part of the hub inner space. The cooling surface 71 of the cooling body 7 of the electronic control module 2 are inserted into the hub inner space 414, preferably to such an extent that they border directly on the hub chambers 45 formed in the hub inner space and thus on the ribs 44.

A sectional view of the assembled electric drive unit is shown in FIG. 3. FIG. 4 shows a side view thereof. The stationary axle 39 of the rotor 32 rotating about the stator 31, is fixed in the opening 38. The rotor 32 is secured on the axle 39 by bearings, seen in FIGS. 3 and 5. The magnets 321 of the rotor 32 are for example secured to the inside of the rotor 32. The electronic control module 2 is centrally arranged below the motor support 33. Hence, the module 2 is positionable completely within the dimensions of the stator 31, more specifically the control module 2 does not extend at any point beyond the motor support 33. This is possible due to the central arrangement of the electronic control module 2 and particularly due to the electrical connection of the electronic control module 2 and the fan motor 3 through the connector elements 28 that are centrally positioned in the electric drive unit 1.

A gap 6 is formed between the inwardly facing side or edge 513 of the central portion 51 of the carrier section 5 and the also inwardly facing side or edge 415 of the hub 41 of the impeller wheel 4. The gap 6 communicates with the inner hub space 414 and thus also with the circumferentially radially outwardly positioned bores or holes 43. The gap 6 also communicates with the radially inwardly positioned elongated holes 322. Due to the rotation of the impeller wheel 4 a pressure differential arises between the air present in the area of the gap 6 and the air present in the area of the bores 43 and the area of the elongated holes 322. This pressure differential is independent of the flow direction of the primary working air flow produced by the rotation of the wings 42 of the impeller wheel 4. As a result, a convection air flow of the air between the gap 6 on the one hand and the bores 43 and the elongated holes 322 on the other hand occurs through the inner hub space 414, whereby the air which has been heated due to the contact with the cooling surfaces 71 of the cooling body 7, discharges from the inner hub space 414 and cool outer air from the surrounding space is supplied into the hub inner space 414. As a result the cooling surfaces 71 of the cooling body 7 are cooled and the structural components 21 of the electronic control module 2 arranged on these cooling surfaces 71 are also cooled. The cooling surfaces 71 extend into the hub inner space 414 preferably directly into the hub chambers 45, i.e. they border directly on the hub chambers 45.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

The invention claimed is:

1. An electric drive unit comprising an electric motor, a motor carrier section (5) supporting said electric motor, said electric motor (3) comprising a stator and a rotor mounted for rotation relative to said stator, said electric motor further comprising an electronic control module (2) including electronic elements (21) and a cooling body (7) having at least one cooling surface (71) in heat transfer contact with said electronic elements (21), said cooling body (7) being supported by said stator, said rotor comprising a hub including a radial hub wall (32) supported for rotation of said rotor relative to said stator about a rotation axle (39), said hub further including at least one axial cylindrical hub wall (411) secured circumferentially to said radial hub wall (32), fan blades (42) secured to said at least one cylindrical hub wall (411) for producing a primary working air flow when said rotor rotates, said drive unit comprising a first set of radially elongated air flow holes (322) extending in said radial hub wall (32) radially outwardly from said rotation axle (39) and a second set of air flow holes (43) positioned in said radial hub wall (32) radially outwardly of said first set of radially elongated air flow holes (322), wherein said first and second set of air flow holes (43, 322) rotate with said hub, a gap (6) between an axially inwardly facing edge (415) of said at least one cylindrical hub wall (411) and an axially inwardly facing edge (513) of said motor carrier (5), said first set of elongated air flow holes (322) and said second set of air flow holes (43) communicating with the atmosphere and with said gap (6) through a hub inner space, and wherein said cooling body (7) reaches at least partially into said hub inner space for cooling of said electronic elements (21) by a secondary cooling airflow generated between said first and second set of air flow holes (322, 43) and said gap (6) when said rotor rotates.

2. The electric drive unit of claim 1, wherein said second set of air flow holes (43) is positioned in said radially extending hub wall (32) of said hub (41) circumferentially next to said at least one axial cylindrical hub wall (411).

3. The electric drive unit of claim 1, wherein said cooling body (7) comprises a plurality of cooling surfaces (71) reaching at least partially into said hub inner space.

4. The electric drive unit of claim 1, comprising a further inner cylindrical hub wall (413) secured to said radial hub wall (32) coaxially to and radially inwardly of said at least one cylindrical hub wall (411), and wherein said second set of air flow holes (43) is positioned in said radial hub wall (32) between said further inner cylindrical hub wall (413) and said at least one cylindrical hub wall (411), said further inner cylindrical hub wall (413) dividing said hub inner space into a radially outer portion and a radially inner air flow portion.

5. The electric drive unit of claim 4, further comprising ribs (44) extending radially between and interconnecting said at least one cylindrical hub wall (411) and said further inner cylindrical hub wall (413), said ribs (44) dividing said hub inner space (414) into individual hub chambers (45), said second set of air flow holes (43) comprising at least one air flow hole communicating with each of said hub chambers (45).

6. The electric drive unit of claim 1, further comprising a stamped grid (24) for electrically contacting said electronic elements (21) of the electronic control module (2), said stamped grid (24) being connected with a bottom side (332) of a motor support (33), and wherein connector elements (28) in the form of stamped grid tabs (26) lead from said stamped grid to connector contacts (36, 37) of said electric motor (3).

7. The electric drive unit of claim 1, wherein said electronic control module (2) comprises commutating switches for commutating said electric motor (3).

8. The electric drive unit of claim 7, wherein said commutating switches are commutation transistors (21).

9. The electric drive unit of claim 1, wherein said electric motor (3) is a brushless DC-motor.

10. The electric drive unit of claim 1, wherein said rotor of said electric motor (3) is an outer rotor (32) rotating on an outer side of said stator (31).

* * * * *